United States Patent [19]

McCracken et al.

[11] 4,404,785
[45] Sep. 20, 1983

[54] POST COVER PLATE

[75] Inventors: Richard W. McCracken, Youngstown; Melvin A. Textoris, Struthers; Philip J. Williams, Poland, all of Ohio

[73] Assignee: GF Business Equipment, Inc., Youngstown, Ohio

[21] Appl. No.: 228,704

[22] Filed: Jan. 23, 1981

[51] Int. Cl.³ .......................... H02G 3/00; E04F 19/04
[52] U.S. Cl. ............................................ 52/290; 174/48
[58] Field of Search .............. 52/238, 239, 243, 243.1; 174/48; 29/515; 165/35

[56] References Cited

U.S. PATENT DOCUMENTS

| | | | |
|---|---|---|---|
| 3,461,220 | 8/1969 | Hukin | 174/48 |
| 3,737,980 | 6/1973 | Kotkins | 29/515 |
| 3,841,042 | 10/1974 | Siegal | 52/239 |
| 3,983,674 | 6/1976 | Yamamoto et al. | 29/515 |
| 4,133,153 | 1/1979 | Hage | 52/220 |
| 4,203,639 | 5/1980 | VandenHoek et al. | 339/22 R |
| 4,231,630 | 11/1980 | Propst et al. | 339/22 R |
| 4,231,630 | 11/1980 | Propst et al. | 174/48 |
| 4,235,495 | 11/1980 | Propst et al. | 339/22 R |
| 4,255,610 | 3/1980 | Textoris | 174/48 |
| 4,267,677 | 5/1980 | Randolph et al. | 52/242 |
| 4,270,020 | 5/1981 | Kenworthy et al. | 174/48 |
| 4,278,834 | 7/1981 | Boundy | 174/48 |

Primary Examiner—James L. Ridgill
Attorney, Agent, or Firm—Emory L. Groff, Jr.

[57] ABSTRACT

A partition assembly includes post cover plates for masking the lower portion of vertical, round posts disposed intermediate a plurality of elevated panels. The upper section of each post cover plate includes an arcuate segment having a curvature substantially mating that of the vertical post cylindrical walls while an attached lower section on the post cover plate is provided with an outer wall having lateral edges substantially aligned with the plane of the outer faces of the adjacent panel or panels. The post cover plates are installed with the lower sections disposed below the plane of the panel bottoms and are retained in position by the engagement of grooves adjacent the lower section lateral edges and the juxtaposed end edges of panel cover plates mounted beneath adjacent panels. By modification of the configuration of both the upper and lower sections, the post cover plates are adaptable to make the lower portion of posts either at the ends of a partition assembly or those posts which are intermediate panels disposed at any relative angle between one another.

12 Claims, 9 Drawing Figures

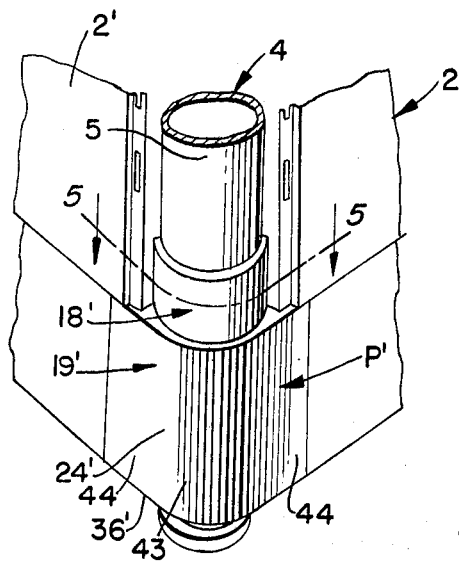
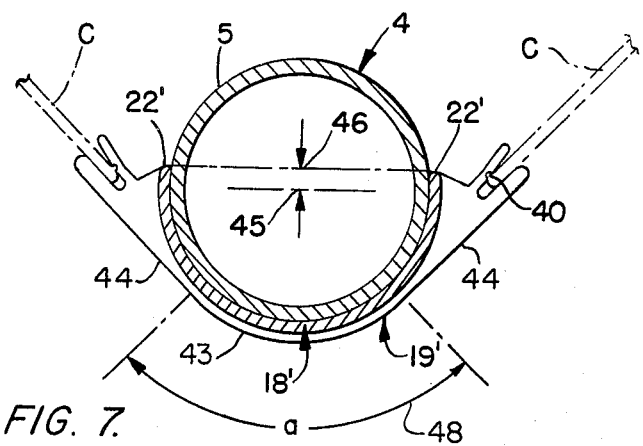
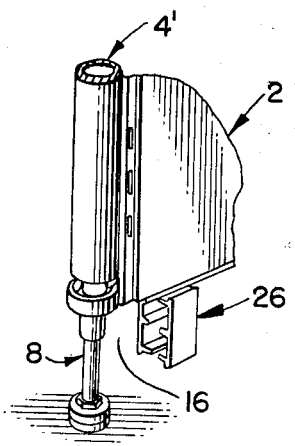
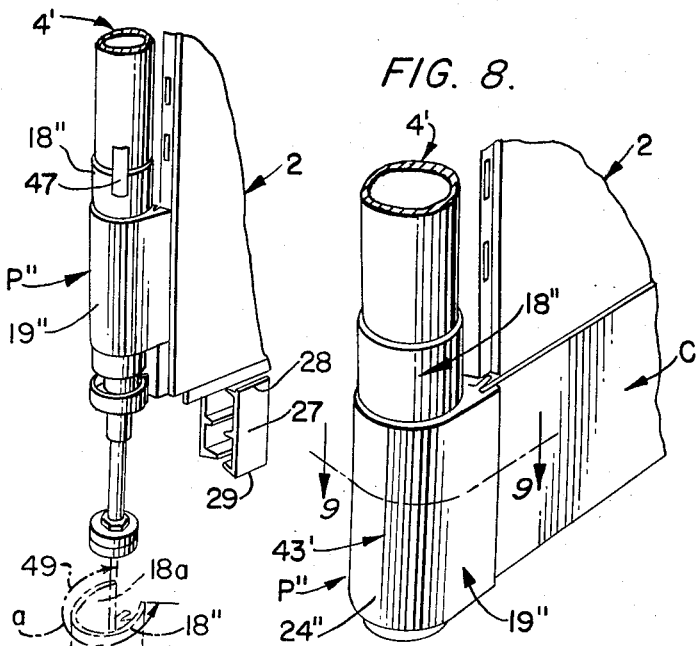
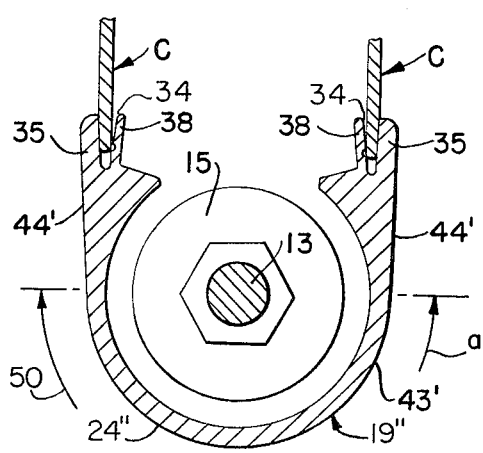

POST COVER PLATE

This invention relates generally to partition assemblies and more particularly to an improved readily removable cover plate adapted to mask the bottom of a vertical post serving to support one or more adjacent elevated panels in the partition assembly.

The cover plate of the present invention is intended to provide an improved manner of shielding from view the unsightly area adjacent the bottom of a cylindrical support or upright post forming a major component of the well-known type of partition assembly which includes a plurality of adjacently disposed elevated panels and intermediate posts. Such partition assemblies have been extremely popular for the past several years and are extensively employed in modern office arrangements particular those of the open space plan wherein a relatively large building interior area is most conveniently divided into a plurality of individual work areas by means of a plurality of such panels and posts in either a straight and/or angular disposition with respect to one another. As is well known to those skilled in the art, these partition assemblies most commonly utilized support posts having their bottom portion elevated by means of an adjustable support assembly. One or more panels are then attached to the periphery of the vertical posts with their respective bottom portions likewise elevated above the underlying planar supporting surface. Numerous attempts have been made to provide closure means beneath the respective panels not only to improve the eye appeal of the installation but also to increase the privacy and security between opposite sides of the assembly. Additionally, it becomes imperative that cover means must be provided when the space beneath the elevated panels is used to accommodate electrical wiring components for users on one or both sides of the partition assembly.

The present invention is directed to a cover plate specifically intended to enclose that portion of a partition assembly located adjacent to and beneath the bottom of the vertical support posts, which area has long presented a problem since such cover means should preferably comprise a unitary member which is economical to fabricate and is readily adaptable to rapid installation by non-skilled personnel and yet results in a tightly fitting member substantially completely masking that area beneath the elevated round posts from the bottom of the post periphery to the underlying supporting surface.

By the present invention, an improved post cover plate is provided having an upper section with a configuration conforming to the curvature of the periphery of the support posts and which is integral with a lower section provided with lateral edges substantially co-planar with the outer faces of the adjacent panel or panels and which lateral edges include outwardly directed grooves cooperating with the end edges of panel cover plates previously installed beneath the bottom of the adjacent panel or panels.

Accordingly, one of the objects of the present invention is to provide an improved post cover plate for a partition assembly and which includes an upper section having a curvature mating with the periphery of a support post and which is joined to a lower section having an outer wall which is configured to serve as an extension of the plane of the outer faces of an adjacent panel or panels.

Another object of the present invention is to provide an improved post cover plate for attachment to a round support post and which includes an arcuate upper section describing an arc of greater than 180° to provide a snap-fit of the upper section about a support post serving as a corner post in a right-angular partition assembly installation.

Still another object of the present invention is to provide an improved post cover plate for a round support post at the end of a partition assembly and which includes an upper section having a curvature defining an arc greater than 180° and which is joined to a lower section having a pair of substantially parallel, spaced apart lateral edges substantially disposed in planes coincident with the planes of the two outer faces of the adjacent panel.

Still another object of the present invention is to provide an improved post cover plate including a lower section adapted to mask the area opposite a support assembly maintaining a cylindrical post in an elevated position, which lower section is joined to a curved upper section having a depending lip on its inner wall engageable within a cup disposed between the post bottom and the support assembly.

With these and other objects in view which will more readily appear as the nature of the invention is better understood, the invention consists in the novel construction, combination and arrangements of parts hereinafter more fully illustrated and claimed.

FIG. 4 is a front perspective view of a modification of the post cover plate as applied to a right-angular partition assembly;

FIG. 5 is an enlarged transverse sectional view taken along the line 5—5 of FIG. 4;

FIG. 6 is a partial top perspective view of a terminal or end-most support post in a partition assembly;

FIG. 7 is a view similar to FIG. 6 and showing a further modification of the present invention as it appears during its initial installation;

FIG. 8 is a perspective view showing the end post cover plate of FIG. 7 as finally installed; and FIG. 9 is a horizontal sectional view taken along the line 9—9 of FIG. 8.

Similar reference characters designate corresponding parts throughout the several figures of the drawings.

Figure 1:
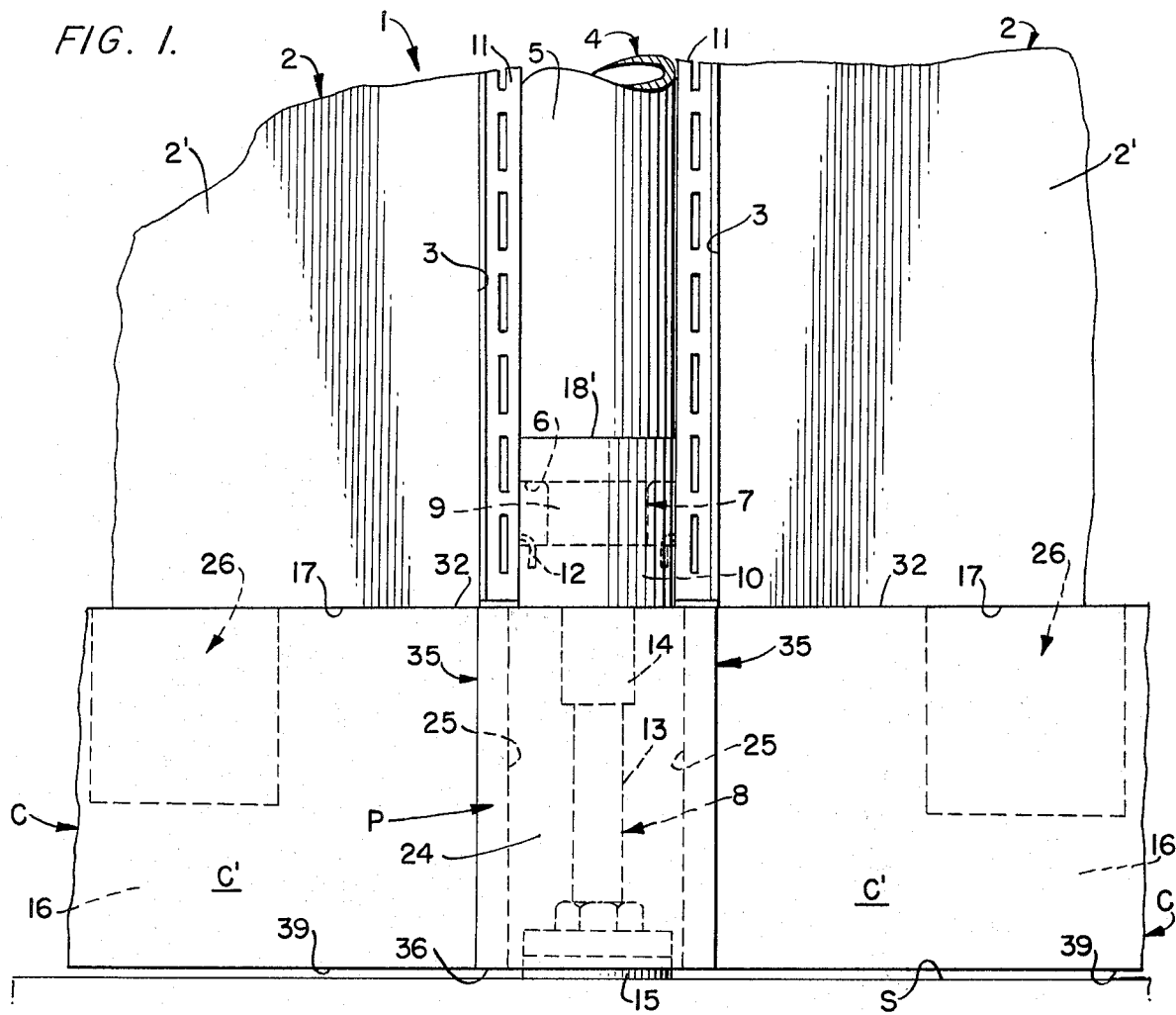
FIG. 1 is a partial front elevation of a partition assembly including a post cover plate according to the present invention.
Figure 2:
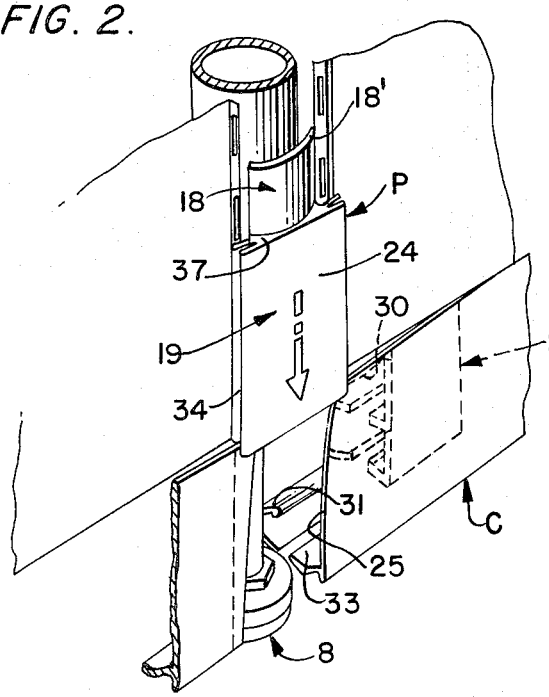
FIG. 2 is a top perspective view of the structure of FIG. 1 illustrating the installation of the post cover plate.
Figure 3:
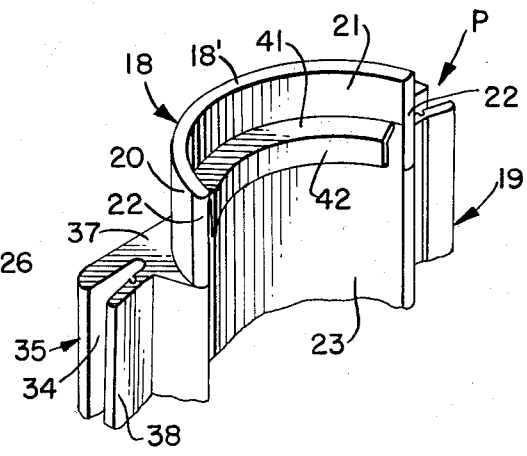
FIG. 3 is an enlarged partial top perspective view of the rear of the cover plate.

Referring now to the drawings, particularly FIGS. 1–3, the present invention will be seen to relate to a partition assembly generally designated 1 of the type employing a plurality of panels 2 provided with opposite outer faces 2' and having their side edges 3 juxtaposed and supported by an intermediate vertical upright or post 4. Each post 4 is preferably round and thus presents a curved or cylindrical periphery 5 and includes a post bottom 6 maintained at a horizontal plane well elevated above the underlying supporting surfaces by means of the post lower mounting member 7 affixed thereto and which in turn is supported by a post support assembly 8. The mounting member 7 includes a central shank 9 of reduced diameter and a lowermost cup 10 and provides means whereby the lower portion of each panel 2 is attached to the post 4.

As shown most clearly in FIG. 1 of the drawings, the panel side edges 3 are provided with an edge channel 11 including an outwardly and downwardly projecting panel hook 12 which is adapted to be lowered within the confines of the mounting member cup 10 to retain the panels in the illustrated position juxtaposed the periphery 5 of the post 4. Appropriate additional well known means (not shown) are provided adjacent the upper portions of each of the panels 2 in order to similarily anchor the top areas of the panels with respect to the intermediate posts 4.

The underlying post support assembly 8 includes a screw shaft 13 adjustable insertable within the internally threaded spindle 14 depending from the cup 10 in order to allow vertical axial adjustment of the shaft 13 to vary the distance of the lowermost glide 15 from the post bottom 6 which adjustment permits accommodation of any uneven configuration in the underlying support surfaces beneath the partition assembly 1. The foregoing described structure is well known in the partition assembly field and the above background establishes the area within which the post cover plate P of the present invention is utilized.

The post cover plates P operate to mask that portion of the bottom space 16 located below the plane of the post bottoms 6 and intermediate the vertical planes as defined by the two adjacent panel side edges 3—3 juxtaposed any single post 4, when the two adjacent panels 2—2 are disposed in a straight line with respect to one another as depicted in the views of FIGS. 1 and 2. Following a description of the post cover plate P, various modifications thereof will be described and which relate to post cover plates adapted for installation in partition assemblies other than in a situation wherein two adjacent panels are axially aligned with respect to one another.

The post cover plate P preferably comprises a unitary member which may be constructed of any suitable material such as aluminum or appropriate plastic composition and includes an upper section 18 projecting upwardly from an attached lower section 19. The vertical height of the lower section 19 is selected to correspond to the height between the panel bottoms 17 and the bottom or lower edge 39 of the panel cover plates C while the top edge 18' of the upper section 19 is selected to extend from the plane of the panel bottoms 17 to a point above the bottom 6 of the round post 4. This upper section will be understood to comprise a curved post segment having an arcuate outer wall 20 and arcuate inner wall 21 terminating in side edges 22—22 describing an arc less than 180° for reasons which will become obvious hereinafter. The inner surface 23 of the lower section 19 may be a mere vertical extension of the upper section inner wall 21 as shown in FIG. 3 of the drawings or alternatively, may be flat as is the outer wall 24 of the lower section.

With an understanding of the manner of installating the post cover plate P, it will be appreciated that the lower section 19 serves as an engaging member adapted to cooperate with the opposed end edges 25—25 of panel cover plates C associated with the adjacent panels 2—2. These panel cover plates C may be constructed of plastic or any other suitable material and serve to fully mask that portion of the bottom space 16 located between the panel bottoms 17 and the underlying supporting surface. These cover plates C thus extend horizontally substantially the distance between the edge channels 11 of each panel 2 and are removably attached beneath each panel such as by means of the hanger members, generally designated 26. Depending upon the width of any individual panel 2, at least a pair of the hanger members 26 are employed beneath each panel bottom 17 and spaced inwardly from the panel side edges 3 thereof.

As shown most clearly in FIGS. 6 and 7 of the drawings, each hanger member 26 includes a pair of outer walls 27—27 vertically disposed beneath the panel outer faces 2' with each outer wall provided with an upper edge 28 and lower edge 29 adapted to cooperate respectively with upper 30 and lower 31 attachment arms projecting inwardly from each panel cover plate C. In this manner, it will be appreciated that the panel cover plates may be readily snap-fitted into the installed position of FIG. 1, each with its top edge 32 juxtaposed the panel bottom 17 and its exterior surface C' substantially planar with the panel outer face 2'. The panel cover plate C may additionally include an inwardly directed bottom flange 33 offering a shelf structure for supporting wiring within the confines of the bottom space 16. Before installation of the post cover plate P of the invention, it will be understood that the end-most portions of each upper and lower attachment arm 30-31 is notched or cutaway to allow assembly of the post cover plate P as will now be described.

Rigid retention of the post cover plate P in the assembled position of FIG. 1 of the drawings, is achieved by engagement of the end edges 25-25 of opposed panel cover plates C within joining means comprising a pair of oppositely directed vertical grooves 34 formed within the lateral edges 35 of the lower section 19. These grooves 34 preferably extend throughout the entire height of the lower section 19, that is, from its lower edge 36 through the upper edge 37 thereof and are formed to provide a tapered cross-section by means of the angularly directed rear arm 38 behind the lateral arm 35 of the outer or front wall 24.

Assembly is initiated by placing the post cover plate P in the position as shown in FIG. 2 of the drawings wherein it will be seen that the outer wall 24 as well as the arcuate segment of the upper section 18 are spaced outwardly from the panel outer faces 2' and post periphery 5, respectively. With the post cover plate P held in this position, the end edges 25 of the two panel cover plates C are temporarily pulled away from their normal snap-fitted, flush position beneath the panels, in order to allow insertion thereof within the outwardly disposed vertical grooves 34—34 whereafter, the post cover plate is merely pushed downwardly in the direction of the arrow of FIG. 2 until its lower edge 36 is juxtaposed the underlying supporting surface S or co-planar with the bottom flanges 33 of the panel cover plate C. When thusly positioned, the interfitted post cover plate P and two adjacent panel cover plates C—C are merely pushed inwardly until the panel cover plates resume their normal snap-fitted disposition beneath the panels and the arcuate inner wall 21 of the upper section 18 of the post cover plate flushly engages, in a mating manner, the curved periphery 5 of the post 4.

The formation of the tapered configuration in the vertical grooves 34 facilitates a snug engagement between the post cover plate P and the two cooperating panel cover plates C, and this relationship is enhanced by the formation of the depth of the grooves 34 an amount which is greater than the depth to be accommodated by the panel cover plate end edges 25 whereupon a slight wedge fit is obtained. However, should a loose installation result, wherein a rattle is detected between the components, it is a simple matter to crimp or angularly displace the top portion of either or both rear arms 38 in order to eliminate this problem. This displacement of the rear arms is assisted by the formation of a relief or score 40 along the inner surface of the rear arms 38 along a line which is approximately that point at which the distal surface of the panel cover plate end edge 25 will be disposed when the post cover plate P is fully installed.

FIG. 3 shows an alternative structure comprising a radial arm 41 from which depends an arcuate lip 42 providing hook means insertable within the cup 10 of the post bottom mounting member 7 in a manner analogous to the panel hooks 12 disposed within the cup 10. The provision of this hook means on the post cover plates P will be understood to offer additional support for the cover plate in the area of its upper seciton 18 and quite obviously, the upper section 18 of the post cover plate will be pushed inwardly so as to engage the depending lip 42 within the confines of the cup 10 at a point wherein the lower edge 36 of the cover plate is still slightly elevated with respect to the panel cover plate bottom edge 39. Now it will be readily appreciated why the side edges 22—22 of the upper section 18 define an arc which is substantially less than 180° for if these side edges 22 were to extend to define too great an arc then they would interfer with the panel hools 12—12 which are already disposed within the cup 10 beneath the post bottom 6.

As previously mentioned, the concept of the post cover plate of the present invention may be utilized to mask the area adjacent and beneath vertical post 4 serving to join adjacent panels disposed in either a straight line or defining any other angular configuration relative one another. Such an alternative panel disposition is shown in the partition assembly 1' illustrated in FIGS. 4 and 5 of the drawings, wherein it will be seen that the two panels 2'—2' are disposed at right angles to one another. Accordingly, a post cover plate P' is provided wherein the upper section 18' comprises a post segment which is curved to provide an arc slightly greater than 180° as most clearly reflected in the cross-sectional illustration of FIG. 5. The lower section 19' likewise is modified to define an outer wall 24' having a central curved portion 43 describing an arc of 90°, as indicated at 48 and which is bounded by two lateral straight portions 44—44.

The manner of attachment of the right angular post cover plate P' is similar to that as previously described in connection with the post cover plate P and in this latter case, it will be appreciated that when the lower edge 36' is co-planar with the bottom edges 39 of the adjacent panel cover plates C, the cover plate P' is pushed inwardly so that the arcuate upper section 18' is snap-fitting about the periphery 5 of the post 4. This snap-fitting will be evident from FIG. 5 which clearly illustrates the curvature of the upper section inner wall 21' as defining an arc greater than 180°. In this figure, the arrow 45 points to the center of the radius of the arcuate inner wall 21' while the arrow 46 points to the line joining the two side edges 22' of the upper section.

The remaining FIGS. 6–9 of the drawings, illustrate a modification wherein an alternative post cover plate P" is configured to provide a masking of the area beneath a terminal post 4' such as would be mounted adjacent the end-most panel 2 in a partition assembly 1". In this modification, the upper section 18" again includes an inner surface 18a encompassing an arc which in this case is substantially greater than 180°, such as 270° as shown in FIG. 7 by the arc 49. The lower section 19" includes an outer wall 24" having a central curved portion 43' describing an arc of 180° as depicted at 50 and which is joined to two straight portions 44'—44' containing the joining means 34 as shown in FIG. 9.

Installation of the post cover plate P" is accomplished by axially sliding the cover plate over either post end to the elevated position as shown in FIG. 7 at which point suitable means such as the piece of adhesive tape 47 may be employed to retain the cover plate P' until the panel cover plates C have been installed. The assembly is completed by removing the tape 47 and sliding the cover plate P" downwardly to engage the panel cover plate end edges 25 within the two grooves 34—34, with the assembly appearing as in FIG. 8. Secure retention is assured in view of the entrapment of the post 4' within the mating confines of the arcuate upper section 18".

From the foregoing, it will be seen that an improved post cover plate is presented having components readily adapted to cooperate with a partition assembly support post associated with one or more panels disposed at any of various angles with respect to the support post. Quite obviously, by following the same concept taught herein, post cover plates having other included angles may be employed.

We claim:

1. A partition assembly having panels provided with side edges attached to support posts having a bottom, said panels having a bottom, support assemblies disposed beneath said post bottoms engageable with an underlying surface to maintain said post bottoms and panel bottoms elevated above said underlying surface to define a bottom space therebetween, one said post attached to one said panel comprising an end-most post in said partition assembly, removable panel cover plates extending beneath said panel bottoms to enclose said bottom space beneath said panels, said panel cover plates having end edges extending laterally to a point short of said post support assemblies, a removable post cover plate adapted to mask that portion of said bottom space from each said post bottom to said underlying surface, said post cover plate including an upper section having a top edge disposed above said post bottom, said post cover plate upper section enveloping a majority of the peripheral extent of said post adjacent its bottom, a lower section extending below said upper section and overlying said support assembly, said lower section provided with opposite lateral edges, joining means on said lateral edges engageable with two said panel cover plate end edges to retain said post cover plate in said masking position, said lower section including a central curved portion defining an arc of substantially 180° and bounded by two straight portions having said joining means thereon, said post including a cylindrical periphery and said post cover plate upper section including an arcuate inner surface having a radius substantially mating the radius of said post, and said upper section arcuate inner surface describing an arc of substantially 270°.

2. A partition assembly including panels provided with side edges having hook means, support posts each having a bottom, cylindrical mounting means spaced beneath said post bottoms receiving said post hook means, said panels each having a bottom, support assemblies disposed beneath said post mounting means, engageable with underlying surface to maintain said post mounting means and panel bottoms elevated above said underlying surface to define a bottom space therebetween, removable panel cover plates extending beneath said panel bottoms to enclose said bottom space beneath said panels, said panel cover plates having end edges extending laterally to a point short of said post support assemblies, a removable preformed post cover plate adapted to be positioned to mask that portion of said bottom space from each said post bottom to said underlying surface, said post cover plate including an upper section having a top edge disposed above said post bottom, said post including a round periphery extending downwardly to said post bottom, said post cover plate upper section having an arcuate inner wall mating with and overlying the curvature of both said post round periphery and said cylindrical mounting means with said post cover plate in said masking position, a lower section extending below said upper section and overlying said support assembly, said lower section provided with opposite lateral edges, and joining means including a vertically extending groove formed on said lateral edges vertically engageable with two said panel cover plate end edges to retain said post cover plate in said masking position.

3. A partition assembly according to claim 1 wherein, said mounting means includes an upwardly directed cup, said post cover plate upper section inner wall having hook means engageable within said cup to retain said upper section juxtaposed said post round periphery.

4. A partition assembly according to claim 1 wherein, said grooves are tapered in cross-section and said panel cover plate end edges provide a wedge fit within said grooves short of the bottoms thereof.

5. A partition assembly according to claim 1 including, a lateral arm and rear arm spaced apart to provide said groove therebetween at each said lateral edge and a score line along one said arm to allow crimping thereof.

6. A partition asssembly according to claim 1 wherein, one said post attached to one said panel comprises an end-most post in said partition assembly, said post cover plate upper section enveloping a majority of the peripheral extent of said post adjacent its bottom, said lower section including a central curved portion having an outer surface, defining an arc of substantially semi-circular configuration and bounded by two straight portions having said joining means thereon.

7. A partition assembly according to claim 6 wherein, said upper section arcuate inner wall describes an arc of substantially 270°.

8. A partition assembly according to claim 1 including, at least two said panels attached to an intermediate said post to define an angular relationship therebetween other than 180°, and said post cover plate lower section including a curved central portion bounded by two straight portions having said joining means thereon.

9. A partition assembly according to claim 8 wherein, said two panels and said post cover plate lateral edges disposed at an angle of 90°, and said upper section arcuate inner wall describes an arc greater than 180° whereby said upper section provides a snap-fit about said post round periphery.

10. A partition assembly according to claim 1 including, at least two said panels attached to opposite sides of one said post along a substantially straight line, and said post cover plate lower section having a substantially planar front wall.

11. A partition assembly according to claim 10 wherein, said post includes a round periphery substantially throughout its length.

12. A partition assembly according to claim 11 wherein, said upper section arcuate inner surface wall describes an arc less than 180°.

* * * * *